US010736018B2

(12) United States Patent
Zhang et al.

(10) Patent No.: US 10,736,018 B2
(45) Date of Patent: Aug. 4, 2020

(54) NEAR FIELD INFORMATION TRANSMISSION

(71) Applicant: Alibaba Group Holding Limited, Grand Cayman (KY)

(72) Inventors: Jie Zhang, Beijing (CN); Kai Cao, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 0 days.

(21) Appl. No.: 16/184,477

(22) Filed: Nov. 8, 2018

(65) Prior Publication Data

US 2019/0098560 A1 Mar. 28, 2019

Related U.S. Application Data

(63) Continuation of application No. 15/492,473, filed on Apr. 20, 2017, now Pat. No. 10,129,817, which is a (Continued)

(30) Foreign Application Priority Data

May 2, 2012 (CN) .......................... 2012 1 0135219

(51) Int. Cl.
*G06F 15/177* (2006.01)
*H04W 48/10* (2009.01)
(Continued)

(52) U.S. Cl.
CPC ............ *H04W 48/10* (2013.01); *G06Q 20/10* (2013.01); *G06Q 20/325* (2013.01);
(Continued)

(58) Field of Classification Search
USPC .......................................................... 709/220
See application file for complete search history.

(56) References Cited

U.S. PATENT DOCUMENTS 6,772,202 B2 8/2004 Wright
7,339,915 B2 3/2008 Jakkahalli et al.
(Continued)

FOREIGN PATENT DOCUMENTS

CN 1013838 B 9/1991
CN 101527911 A 9/2009
(Continued)

OTHER PUBLICATIONS

Extended European Search Report dated Jun. 11, 2019, for European Patent Application No. 19175131.2, 12 pages.
(Continued)

*Primary Examiner* — Alicia Baturay
(74) *Attorney, Agent, or Firm* — Lee & Hayes, P.C.

(57) ABSTRACT

The present application provides a near field information transmission method and system, an information transmitting client, an information receiving client, and an information system. The information transmitting client transmits an acquisition request to the information system. The information transmitting client receives a random number that corresponds to the acquisition request and is returned by the information system. The random number corresponds to the information of said information transmitting client. The information transmitting client uses the random number as a service set identifier of a hotspot, and the service set identifier is broadcast through a beacon frame of a wireless communication protocol. The present techniques conduct near field information transmission conveniently and accurately.

10 Claims, 8 Drawing Sheets

Related U.S. Application Data continuation of application No. 13/886,008, filed on May 2, 2013, now Pat. No. 9,680,688.

(51) Int. Cl.

| | |
|---|---|
| ***H04W 48/08*** | (2009.01) |
| ***H04W 48/16*** | (2009.01) |
| ***H04L 29/08*** | (2006.01) |
| ***G06Q 20/10*** | (2012.01) |
| ***G06Q 20/32*** | (2012.01) |
| ***H04W 8/26*** | (2009.01) |
| *H04W 8/00* | (2009.01) |
| *H04W 64/00* | (2009.01) |
| *H04W 84/12* | (2009.01) |
| *H04L 29/06* | (2006.01) |

(52) U.S. Cl.

CPC ......... *H04L 29/08108* (2013.01); *H04W 8/26* (2013.01); *H04W 48/08* (2013.01); *H04W 48/16* (2013.01); *G06Q 20/3224* (2013.01); *G06Q 20/3278* (2013.01); *H04L 67/42* (2013.01); *H04W 8/005* (2013.01); *H04W 64/00* (2013.01); *H04W 84/12* (2013.01)

(56) References Cited

U.S. PATENT DOCUMENTS

| | | | | |
|---|---|---|---|---|
| 7,362,722 | B2 | 4/2008 | Otsuka | |
| 7,362,772 | B1 | 4/2008 | Otsuka | |
| 7,630,937 | B1 | 12/2009 | Mo et al. | |
| 7,688,820 | B2 | 3/2010 | Forte et al. | |
| 7,801,542 | B1 | 9/2010 | Stewart | |
| 7,986,642 | B2 | 7/2011 | Ishimoto | |
| 7,986,940 | B2 | 7/2011 | Lee et al. | |
| 8,559,626 | B2 | 10/2013 | Ducharme et al. | |
| 8,559,627 | B2 | 10/2013 | Ducharme et al. | |
| 8,559,628 | B2 | 10/2013 | Ducharme et al. | |
| 8,559,629 | B2 | 10/2013 | Ducharme et al. | |
| 8,621,071 | B1 | 12/2013 | Scofield et al. | |
| 8,650,311 | B2 | 2/2014 | Dattagupta et al. | |
| 8,681,691 | B2 | 3/2014 | Shen et al. | |
| 8,848,915 | B2 | 9/2014 | Park et al. | |
| 9,130,993 | B2 | 9/2015 | Horisawa | |
| 9,148,781 | B2 | 9/2015 | Le Sage | |
| 9,253,589 | B2 | 2/2016 | McCann et al. | |
| 9,680,688 | B2 | 6/2017 | Zhang et al. | |
| 10,129,817 | B2 * | 11/2018 | Zhang .................. | G06Q 20/325 |
| 2002/0010783 | A1 | 1/2002 | Primak et al. | |
| 2004/0019801 | A1 | 1/2004 | Lindholm et al. | |
| 2005/0114261 | A1 | 5/2005 | Lin | |
| 2005/0164634 | A1 | 7/2005 | Tanaka et al. | |
| 2006/0106729 | A1 | 5/2006 | Roberts, Jr. | |
| 2006/0268743 | A1 | 11/2006 | Yoshida | |
| 2007/0030824 | A1 | 2/2007 | Ribaudo et al. | |
| 2007/0258368 | A1 | 11/2007 | Dickerson et al. | |
| 2007/0266236 | A1 | 11/2007 | Colditz | |
| 2008/0041936 | A1 | 2/2008 | Vawter | |
| 2008/0078831 | A1 | 4/2008 | Johnson et al. | |
| 2008/0126519 | A1 | 5/2008 | Knespel et al. | |
| 2008/0160957 | A1 | 7/2008 | Ono | |
| 2009/0010230 | A1 | 1/2009 | Lee et al. | |
| 2009/0192912 | A1 | 7/2009 | Griffin et al. | |
| 2009/0192935 | A1 | 7/2009 | Griffin et al. | |
| 2010/0067406 | A1 | 3/2010 | Suzuki | |
| 2010/0082481 | A1 | 4/2010 | Lin et al. | |
| 2010/0325425 | A1 | 12/2010 | Park et al. | |
| 2011/0126008 | A1 | 5/2011 | Song et al. | |
| 2011/0238573 | A1 | 9/2011 | Varadarajan | |
| 2011/0270764 | A1 | 11/2011 | Mizani Oskui | |
| 2012/0010923 | A1 | 1/2012 | Yarmolich | |
| 2012/0033568 | A1 | 2/2012 | Park et al. | |
| 2012/0066035 | A1 | 3/2012 | Stanger et al. | |
| 2012/0150669 | A1 | 6/2012 | Langley et al. | |
| 2012/0173433 | A1 | 7/2012 | Park et al. | |
| 2013/0006872 | A1 | 1/2013 | Chandoor et al. | |
| 2013/0172077 | A1 | 7/2013 | Yu et al. | |
| 2013/0290176 | A1 | 10/2013 | Tirumalashetty | |
| 2013/0297730 | A1 | 11/2013 | Zhang et al. | |
| 2017/0223611 | A1 | 8/2017 | Zhang et al. | |

FOREIGN PATENT DOCUMENTS

| | | | |
|---|---|---|---|
| CN | 101568189 | A | 10/2009 |
| CN | 101741704 | A | 6/2010 |
| CN | 101860856 | A | 10/2010 |
| CN | 102301353 | A | 12/2011 |
| EP | 2437463 | | 4/2012 |
| JP | 2002229833 | A | 8/2002 |
| JP | 2004310222 | | 11/2004 |
| JP | 2006261939 | | 9/2006 |
| JP | 2006332863 | | 12/2006 |
| JP | 2007274707 | | 10/2007 |
| JP | 2007306312 | | 11/2007 |
| JP | 2008028788 | | 2/2008 |
| WO | WO2012027708 | | 3/2012 |

OTHER PUBLICATIONS

Arakawa, et al., "WiFiTag: Direct Link from the Real World to Online Digital Contents", P2P, Parallel, Grid, Cloud and Internet Computing (3PGCIC), 2012 Seventh International Conference, Nov. 12, 2012, pp. 339-344.

Chinese Office Action dated Jul. 31, 2015 from CN Patent Application 201210125219.3, 10 pages.

Chinese Office Action dated Jan. 1, 2012 for Chinese patent application No. 201210135219.3, a counterpart foreign application of U.S. Appl. No. 13/886,008, 39 pages.

Translated Japanese Office Action dated Dec. 26, 2017 for Japanese Patent Application No. 2015-510460, a counterpart foreign application of U.S. Pat. No. 9,680,688, 12 pages.

Translated Japanese Office Action dated Apr. 18, 2017 for Japanese Patent Application No. 2015-510460, a counterpart foreign application of U.S. Appl. No. 13/886,008, 11 pages.

Office Action for U.S. Appl. No. 15/492,473, dated Oct. 18, 2017, Zhang et al., "Near Field Information Transmission", 27 pages.

Office action for U.S. Appl. No. 13/886,008, dated Oct. 25, 2016, Zhang et al., "Near Field Information Transmission", 18 pages.

Office action for U.S. Appl. No. 13/886,008, dated Nov. 23, 2015, Zhang et al., "Near Field Information Transmission", 20 pages.

Office Action for U.S. Appl. No. 13/886,008, dated Mar. 27, 2015, Jie Zhang, "Near Field Information Transmission", 13 pages.

Office Action for U.S. Appl. No. 15/492,473, dated Mar. 8, 2017, Zhang et al., "Near Field Information Transmission", 7 pages.

Office action for U.S. Appl. No. 13/886,008, dated May 5, 2016, Zhang et al., "Near Field Information Transmission", 18 pages.

Office Action for U.S. Appl. No. 13/886,008, dated Jun. 25, 2015, Jie Zhang, "Near Field Information Transmission", 16 pages.

PCT Search Report dated Jul. 24, 2013 for PCT application No. PCT/US13/39311, 16 pages.

English translation Chinese Office Action dated Jul. 29, 2019 for Chinese Patent Application No. 201710088369.6, a counterpart foreign application of U.S. Appl. No. 16/184,477, 10 pages.

Chinese Search Report dated Jul. 19, 2019 for Chinese Patent Application No. 2017100883696, 2 pages.

First Chinese Search Report dated Jul. 17, 2015 for Chinese Patent Application No. 2012101352193, 2 pages.

Japanese Office Action dated Feb. 12, 2019 for Japanese Patent Application No. 2018-089295, a counterpart of U.S. Pat. No. 9,680,688, 21 pages.

* cited by examiner

NEAR FIELD INFORMATION TRANSMISSION

CROSS REFERENCE TO RELATED PATENT APPLICATIONS

This application is a continuation of U.S. patent application Ser. No. 15/492,473 filed Apr. 20, 2017, which is a continuation of U.S. application Ser. No. 13/886,008 filed May 2, 2013, issued as U.S. Pat. No. 9,680,688 on Jul. 13, 2017, and claims foreign priority to Chinese Patent Application No. 201210135219.3 filed on 2 May 2012, entitled "Method, Information Transmitting and Receiving Client, and Information System for Transmitting Near Field Information," all of which are hereby incorporated by reference in their entirety.

TECHNICAL FIELD

The present disclosure relates to the field of network communication technologies and, more specifically, to a near field information transmission method and system, an information transmitting client, an information receiving client, and an information system.

BACKGROUND

Information plays a very important role in social life. Valuable information needs to be exchanged among people. Along with the development of mobile communication technologies, in particular, near field information transmission has become increasingly popular. In the application scenario of near field payment, for example, a first issue of a third party payment is how to transmit a seller's account information to a buyer.

The conventional techniques primarily use the following methods for near field information transmission.

Two-dimensional code scanning requires a transmitting party to turn on the camera function to take a picture of the information and transmit the picture to a receiving party. The two-dimensional code scanning method has light requirements and needs complex operations.

Global Positioning System (GPS) positioning requires the transmitting party to obtain latitude and longitude data through GPS and then transmit the latitude and longitude data to an information system through a mobile network and the information system identifies corresponding information based on the latitude and longitude data. GPS has relatively high requirements for the data collection accuracy. When two transmitting parties are very close to each other, in particular, it is difficult to determine which one is the transmitting party. In general, the accuracy of GPS positioning tends to be affected by a number of factors. As a result, it is difficult for the accuracy of near field information transmission to meet the requirements.

Voice transmission has very high requirements for the surrounding environment, and moreover, noise interference tends to affect the voice collection, thereby lowering the accuracy of near field information transmission.

Manual input requires the transmitting party to manually input information by means of a text message or other methods, which is inconvenient and easy to result in errors from any negligence, thereby making it difficult to ensure the accuracy of near field information transmission.

In summary, the conventional techniques cannot conduct near field information transmission conveniently and accurately.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides a near field information transmission method and system, an information transmitting client, an information receiving client, and an information system for efficient and accurate near field information transmission.

The present disclosure provides an example near field information transmission method. An information transmitting client transmits an acquisition request to an information system. The information transmitting client receives a random number corresponding to the acquisition request returned by the information system. The random number corresponds to information of the information transmitting client.

The information transmitting client uses the random number as a service set identifier of a personal wireless hotspot. The service set identifier is broadcast through a communication such as a beacon frame of a wireless communication protocol. The wireless communication protocol may, for example, include the IEEE 802.11 protocol.

The present disclosure also provides another example near field information transmission method. According to content broadcast by communication such as a beacon frame of a wireless communication protocol, an information receiving client acquires a service set identifier of a wireless hotspot that has a highest signal intensity. The service set identifier of the wireless hotspot that has the highest signal intensity is a random number issued by an information system to an information transmitting client, and the random number is generated by the information system and corresponds to information of the information transmitting client.

The information receiving client transmits the service set identifier of the wireless hotspot that has the highest signal intensity to the information system.

The information receiving client receives the information of the information transmitting client that is returned by the information system and corresponds to the service set identifier of the wireless hotspot that has the highest signal intensity.

For example, the information receiving client may acquire the service set identifier of the wireless hotspot that has the highest signal intensity according to the content broadcast by the beacon frame of the wireless communication protocol according to the following operations.

A detection command is transmitted to a WiFi module from the information receiving client. The information receiving client receives a list of service set identifiers of wireless hotspots and corresponding signal intensity information returned by the WiFi module according to the detection command. The information receiving client identifies the service set identifier of the wireless hotspot that has the highest signal intensity from the list of service set identifiers of the wireless hotspots.

For another example, the method may further include the following operations.

The WiFi module scans wireless network beacon frames according to the detection command to obtain the list of service set identifiers of the wireless hotspots. The WiFi module detects signal intensity information of the wireless hotspots in the list of service set identifiers of the wireless hotspots. The WiFi module analyzes the wireless hotspots in the list of service set identifiers of the wireless hotspots to obtain the corresponding service set identifiers. The WiFi module returns the list of service set identifiers of the wireless hotspots and corresponding signal intensity information.

The present disclosure also provides another example near field information transmission method. An information system receives an acquisition request from an information transmitting client. The information system obtains a corresponding random number according to the acquisition request, and returns it to the corresponding information transmitting client. The information system stores the random number and the information of the corresponding information transmitting client in accordance with a mapping relationship between the random number and the information of the information transmitting client.

The information system receives a service set identifier of the wireless hotspot from the information receiving client. The information system matches the service set identifier of the wireless hotspot with the random number in accordance with the mapping relationship to obtain information of the corresponding information transmitting client. The information system returns the information of the information transmitting client obtained from the matching to the corresponding information receiving client.

For example, the information system may obtain the corresponding random number according to the acquisition request by using the following operations. The random number is generated by using a random algorithm or a Hash algorithm. Parameters of the random algorithm or the Hash algorithm may include one or more of the following parameters: a date of the acquisition request, a time of the acquisition request, and the information of the information transmitting client corresponding to the acquisition request.

For another example, the method may further include the following operations. A random data table is used to store the mapping relationship between the random number and the information of the information transmitting client. Information of the random number stored in the random data table may include one or more of the following: a numeric value of the random number, a generation date and/or a generation time of the random number.

The present disclosure also provides an example information transmitting client including a request transmitting device, a random number receiving device, and a service set identifier setting device.

The request transmitting device transmits an acquisition request to an information system. The random number receiving device receives a random number corresponding to the acquisition request and returned by the information system. The random number corresponds to the information of the information transmitting client. The service set identifier setting device uses the random number as a service set identifier of a personal hotspot. The service set identifier is broadcast through communication such as a beacon frame of a wireless communication protocol. For instance, the wireless communication protocol may include the IEEE 802.11 protocol.

The present disclosure also provides another example information receiving client including an identifier acquisition device, an identifier transmitting device, and an information receiving device.

The identifier acquisition device acquires a service set identifier of a wireless hotspot that has the highest signal intensity according to content broadcast by communication such as a beacon frame of a wireless communication protocol. The service set identifier of the wireless hotspot that has the highest signal intensity is a random number issued by an information system to an information transmitting client, and the random number is generated by the information system and corresponds to information of the information transmitting client.

The identifier transmitting device transmits the service set identifier of the wireless hotspot that has the highest signal intensity to the information system. The information receiving device receives the information of the information transmitting client that is returned by the information system and corresponds to the service set identifier of the wireless hotspot that has the highest signal intensity.

For example, the identifier acquisition device may include a command transmitting module, a result receiving module, and an identifying module.

The command transmitting module transmits a detection command to a WiFi module. The result receiving module receives a list of service set identifiers of the wireless hotspots and their corresponding signal intensity information returned by the WiFi module according to the detection command. The identifying module at the information receiving client identifies the service set identifier of the wireless hotspot that has the highest signal intensity from the list of service set identifiers of the wireless hotspots.

Correspondingly, the WiFi module may include a scanning sub-module, a detecting sub-module, an analyzing sub-module, and a returning sub-module.

The scanning sub-module scans the wireless network beacon frames according to the detection command to obtain the list of service set identifiers of the wireless hotspots. The detecting sub-module detects signal intensity information of the wireless hotspots in the list of service set identifiers of the wireless hotspots. The analyzing sub-module analyzes the wireless hotspots in the list of service set identifiers to obtain corresponding service set identifiers. The returning sub-module returns the list of service set identifiers of the wireless hotspots and their corresponding signal intensity information.

The present disclosure also provides an example information system. The example information system may include a request receiving device, a random number generating device, a random number returning device, a first storage device, an identifier receiving device, a matching device, and an information returning device.

The request receiving device receives an acquisition request from an information transmitting client. The random number generating device obtains a corresponding random number according to the acquisition request. The random number returning device returns the random number to the corresponding information transmitting client. The first storage device stores the random number and information of the corresponding information transmitting client with a mapping relationship between the random number and the information of the information transmitting client. The identifier receiving device receives the service set identifier of the wireless hotspot from the information receiving client. The matching device matches the service set identifier of the wireless hotspot with the random number in accordance with the mapping relationship to obtain the information of the corresponding information transmitting client. The information returning device returns the information of the information transmitting client obtained from the matching to the corresponding information receiving client.

For example, the random number generating device may generate the random number by using a random algorithm or a Hash algorithm. Parameters of the random algorithm or the Hash algorithm may include one or more of the following: a date of the acquisition request, a time of the acquisition request, and the information of the information transmitting client corresponding to the acquisition request.

For example, the information system may further include a second storage device. The second storage device uses a random data table to store the mapping relationship between the random number and the information of the information transmitting client. Information of the random number stored in the random data table may include a numeric value of the random number, a generation date and/or generation time of the random number.

The present disclosure also provides another example near field information transmission method.

An information transmitting client transmits an acquisition request to an information system. The information system receives the acquisition request from the information transmitting client, obtains a corresponding random number according to the acquisition request, and returns it to the corresponding information transmitting client.

The information system stores the random number and the information of the corresponding information transmitting client with a mapping relationship between the random number and the information of the information transmitting client.

The information transmitting client receives the random number that is returned by the information system and corresponds to the acquisition request and uses the random number as the service set identifier of personal hotspot. The service set identifier is broadcast through a beacon frame of a wireless communication protocol.

According to the content broadcast by the beacon frame of the wireless communication protocol, the information receiving client acquires a service set identifier of a hotspot that has the highest signal intensity and transmits the service set identifier of the wireless hotspot that has the highest signal intensity to the information system. The service set identifier of the wireless hotspot that has the highest signal intensity is a random number issued by the information system to the information transmitting client.

The information system receives the service set identifier of the wireless hotspot from the information receiving client, matches the service set identifier of the wireless hotspot with the random number in accordance with the mapping relationship to obtain the information of the corresponding information transmitting client, and returns it to the corresponding information receiving client.

The information receiving client receives the information of the information transmitting client that is returned by the information system and corresponds to the service set identifier of the wireless hotspot that has the highest signal intensity.

The present disclosure also discloses another near field information transmission system including an information transmitting client, an information receiving client, and an information system.

The information transmitting client may include a request transmitting device, a random number receiving device, and a service set identifier setting device.

The request transmitting device transmits an acquisition request to the information system. The random number receiving device receives the random number that is returned by the information system and corresponds to the acquisition request. The service set identifier setting device uses the random number as the service set identifier of a personal hotspot. The service set identifier may be broadcast through a beacon frame of a wireless communication protocol.

The information receiving client may include an identifier acquiring device, an identifier transmitting device, and an information receiving device.

The identifier acquiring device acquires a service set identifier of a hotspot that has the highest signal intensity according to the content broadcast by a beacon frame of the wireless communication protocol. The service set identifier of the wireless hotspot that has the highest signal intensity is a random number issued by the information system to the information transmitting client. The identifier transmitting device transmits the service set identifier of the wireless hotspot that has the highest signal intensity to the information system. The information receiving device receives information of the information transmitting client that is returned by the information system and corresponds to the service set identifier of the wireless hotspot that has the highest signal intensity.

The information system may include a request receiving device, a random number generating device, a random number returning device, a first storage device, an identifier receiving device, a matching device, and an information returning device.

The request receiving device receives an acquisition request from the information transmitting client. The random number generating device obtains the corresponding random number according to the acquisition request. The random number returning device returns the random number to the corresponding information transmitting client. The first storage device stores the random number and the information of the corresponding information transmitting client with a mapping relationship between the random number and the information of the information transmitting client. The identifier receiving device receives the service set identifier of the wireless hotspot from the information receiving client. The matching device matches the service set identifier of the wireless hotspot with the random number in accordance with the mapping relationship to obtain the information of the corresponding information transmitting client. The information returning device returns the information of the information transmitting client obtained from the matching to the corresponding information receiving client.

The example embodiments of the present disclosure use personal hotspot's service set identifier (SSID) for near field information transmission, and use the random number to map the information to be transmitted. With respect to an information transmitting party, complex user operations are not needed, and just an electronic apparatus that activates the near field information transmission function of the information transmitting client is needed. With respect to an information receiving party, the service set identifier of a hotspot that has the highest signal intensity can be acquired without complex user operations. Since the service set identifier of the wireless hotspot that has the highest signal intensity is the random number issued by the information system to the information transmitting client, and the random number is generated by the information system and corresponds to the information of the information transmitting client, the information receiving client can obtain the information of the information transmitting client based on a communication with the information system. Therefore, the present techniques may conveniently and efficiently conduct near field information transmission.

In addition, the personal hotspot SSID includes objective characters that may not be easily affected by subjective factors, such as noise, light and input error. Therefore, the present techniques may effectively ensure the accuracy of near field information transmission.

Furthermore, the random number as the personal hotspot SSID may be generated by a variety of Hash algorithms, such as MD5 and SHA, or a variety of random algorithms. As the information to be transmitted is mapped through the random number, and the random number has a valid time period, the present techniques may therefore ensure the security of near field information transmission.

Furthermore, in the event that wireless local area network (WLAN) function is turned on, a built-in WiFi module in the electronic apparatus may have functions such as scanning beacon frames of wireless communication protocols, detecting signal intensity information of the wireless hotspots, and analyzing corresponding service set identifiers according to the wireless hotspots. Therefore, the present techniques may also acquire the service set identifier of the hotspot that has the highest signal intensity by using the existing functions of the WiFi module, thereby saving cost.

In summary, the present disclosure has advantages of being simple and easy, high reliability, low implementation cost, and high security and accuracy. It can be implemented simply by installing specific client software on electronic apparatuses by customers and businesses.

BRIEF DESCRIPTION OF THE DRAWINGS

To better illustrate embodiments of the present disclosure, the following is a brief introduction of the FIGs to be used in the description of the embodiments. It is apparent that the following FIGs only relate to some embodiments of the present disclosure. A person of ordinary skill in the art can obtain other FIGs according to the FIGs in the present disclosure without creative efforts.

DETAILED DESCRIPTION

To illustrate the purposes, characteristics, and advantages of the present techniques, the following descriptions are described by reference to the FIGs and some example embodiments.

First, a wireless local area network (WLAN) is introduced. WiFi is a term published by Wireless Ethernet Compatibility Alliance (WECA). It is a short range wireless transmission technology, which can support wireless signals of Internet access in a range of several hundred feet. Along with the technological development, as well as emergence of specifications such as IEEE 802.11a and IEEE 802.11g, the IEEE 802.11 specifications have been collectively referred to as Wi-Fi.

As WLAN has been extensively used, wireless has become a most common way of network access for consumers in an era of mobile information. The wireless Internet access can make PCs, cell phones, tablets and other electronic apparatuses connect to each other in a wireless manner, which is more convenient and rapid and consequently popular with more and more users.

As one type of WLAN, wireless hotspot refers to locations in public areas that provide WLAN service for Internet access. These locations are mostly cafeterias, restaurants, airports, stations, commercial hotels, higher education institutions, and large exhibition halls. Some of these wireless hotspots provide wireless broadband access service at a fee, while others are free. In areas with hotspot coverage, a user may access Internet by using a PC, a cell phone, a tablet or other electronic apparatuses that are supported by a built-in or an external wireless network card.

Currently, more and more electronic apparatuses support a wireless hotspot mode. The electronic apparatuses include not only fixed terminal apparatuses but also mobile terminal apparatuses such as laptops, cell phones, and tablets.

A service set identifier (SSID) is an identification (ID) of an access point (AP) or a wireless router. SSID is used primarily to differentiate wireless networks and includes at most 32 characters. It is the ID for wireless access. As long as an electronic apparatus has a wireless network card that supports a scanning function, it can easily access the hotspot through the SSID.

With respect to the hotspot of the electronic apparatus, a factory default SSID is usually a specific name, such as a model number of the electronic apparatus, and users typically will not manually change the SSID. In practice, however, the SSID can be modified.

The example embodiments of the present disclosure use personal hotspot SSID for near field information transmission. As long as an information transmitting party and an information receiving party install corresponding client software on the electronic apparatuses, the near field information transmission can be performed rapidly and accurately.

Figure 1:
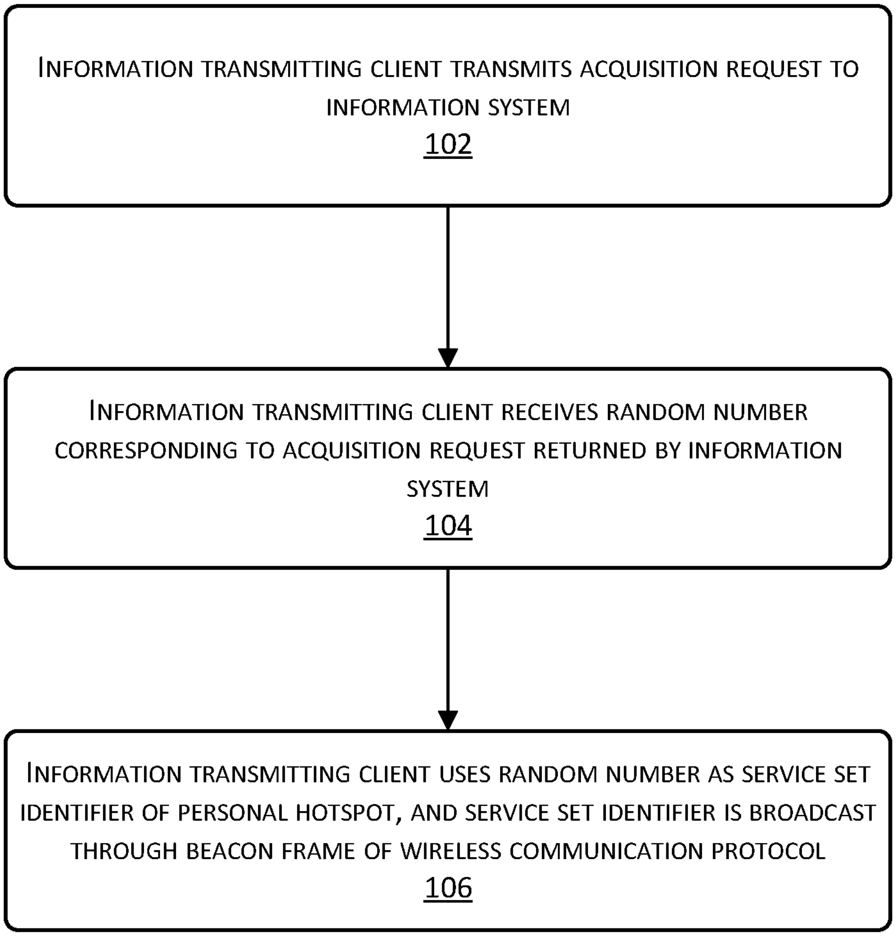
FIG. 1 illustrates a flowchart of a first example method of near field information transmission according to the present disclosure.

FIG. 1 illustrates a flowchart of a first example method of near field information transmission according to the present disclosure.

At 102, an information transmitting client transmits an acquisition request to an information system.

At 104, the information transmitting client receives a random number corresponding to the acquisition request returned by the information system. The random number corresponds to information of the information transmitting client.

At 106, the information transmitting client uses the random number as the service set identifier of personal hotspot, and the service set identifier is broadcast through communication such as a beacon frame of a wireless communication protocol.

The present techniques may be used in various near field information transmission scenarios. In an example application scenario of near field payment, a first issue of third party payment is how to transmit a seller's account information to a buyer. The near field payment scenario may further include scenarios such as an acting appointment (AA) collection, a transfer between a payee and a payer. The following is illustrated by using near field information transmission in the AA collection scenario, which can be used as reference for other application scenarios such as verification and cancellation of discount voucher/delivery coupon, sign-in, etc.

AA collection refers to an instant payment transaction created by a payee. When the transaction is created, an instant payment transaction, which may be called "waiting for buyer to pay", will show up in an payer's account. The payer may log into a third party payment platform, such as an Alipay™ account, and make a payment through the third party payment platform such as through an interface called "Transaction records." When the payment is successful, the payee will instantly receive the transaction fund. When the transaction is created, the payee (located at the information transmitting client) needs to transmit the account information in near field to the payer (located at the information receiving client).

In the AA collection application scenario, the payee may use an electronic apparatus to activate the near field information transmission function of the information transmitting client. The information transmitting client then sends the acquisition request to the information system. Corresponding activation methods may be an operation in a variety of ways. For example, the payee may shake the electronic apparatus, press a corresponding button, etc. The present disclosure does not restrict any specific activation method.

Since the present disclosure uses personal hotspot SSID to transmit information, the electronic apparatus' personal hotspot should also be turned on when the near field information transmission function of the information transmitting client is activated. In a practical application, the information transmitting client may control the on or off function of the personal hotspot. For example, when the payee activates the near field information transmission function of the information transmitting client or a user turns on the information transmitting client, the information transmitting client may control the personal hotspot to turn on and off. The information transmitting client may also turn off the personal hotspot after a preset time interval (e.g., 1 hour) or when the user shuts down the information transmitting client. Certainly, the user may also manually turn on or off of the personal hotspot of the electronic apparatus. The present disclosure does not impose any restriction herein.

In the example embodiment of the present disclosure, the information transmitting client uses the random number returned by the information system as the personal hotspot SSID. Therefore, a number of bytes of the random number need to meet the specification requirement for SSID, i.e., the number of bytes of the random number is equal to or smaller than 32.

In an example embodiment of the present disclosure, the random number is a numeral. Thus, ASCII characters corresponding to the numeral may be used as the SSID for broadcasting. For example, the random number returned by the information system may include 16 HEX numbers such as 0x13, 0x24, 0x78, 0x96 . . . (HEX is composed of any number of hexadecimal records). The corresponding SSID is a string of "13247896 . . . "

In an example embodiment of the present disclosure, the wireless communication protocol may specifically include the IEEE 802.11 protocol.

In the course of information transmission by the information transmitting client through the personal hotspot, an 802.11 beacon frame may be used in the example embodiment.

The 802.11 beacon frame is a management frame of IEEE 802.11 WLAN. An access point will send out a beacon signal at a set interval to declare an existence of an 802.11 network so that a WLAN client is aware of available networks and access points in a designated area. Thus, the WLAN client may choose a network and access point.

Table 1 illustrates an example format of a beacon frame in a management frame. A $4^{th}$ field in the beacon frame represents the SSID. It should be noted that the management frame of IEEE 802.11 may also be expanded and management frames of various vendors may slightly differ. Table 1 simply provides an example of the management frame that contains fundamental information, which shall not be construed as a limitation.

TABLE 1

| Order | Description | Length |
|---|---|---|
| 1 | Time Stamp | 8 |
| 2 | Beacon Interval | 2 |
| 3 | Capability | 2 |
| 4 | SSID | 2-34 |
| 5 | Supported rates | 3-10 |
| 6 | FH Parameter Set | 7 |
| 7 | DS Parameter Set | 3 |
| 8 | CF Parameter Set | 8 |
| 9 | IBSS Parameter Set | |
| 10 | TIM | 4 |
| 11 | Country | 8-256 |
| 12 | FH Pattern Parameters | |
| 13 | FH Pattern Table | |
| 14 | Power Constraint | 3 |
| 15 | Channel Switch Announcement | 5 |
| 16 | Quiet | 8 |
| 17 | IBSS DFS | 10-255 |
| 18 | TPC Report | 4 |
| 19 | ERP Information | 3 |
| 20 | Extended Supported Rates | 3-257 |
| 21 | RSN | 36-256 |
| 22 | BSS Load | 7 |
| 23 | EDCA Parameter Set | 20 |
| 24 | QoS Capability | 3 |
| Last | Vendor Specific | |

In summary, the example embodiments of the present disclosure use personal hotspot SSID for near field information transmission. With respect to the information transmitting party, there is no need of complex user operations, and just an electronic apparatus that activates the near field information transmission function of the information transmitting client is needed. In addition, as the personal hotspot SSID includes objective characters that are not easily affected by subjective factors, such as noise, light, input error, the present techniques may effectively ensure the accuracy of near field information transmission.

Figure 2:
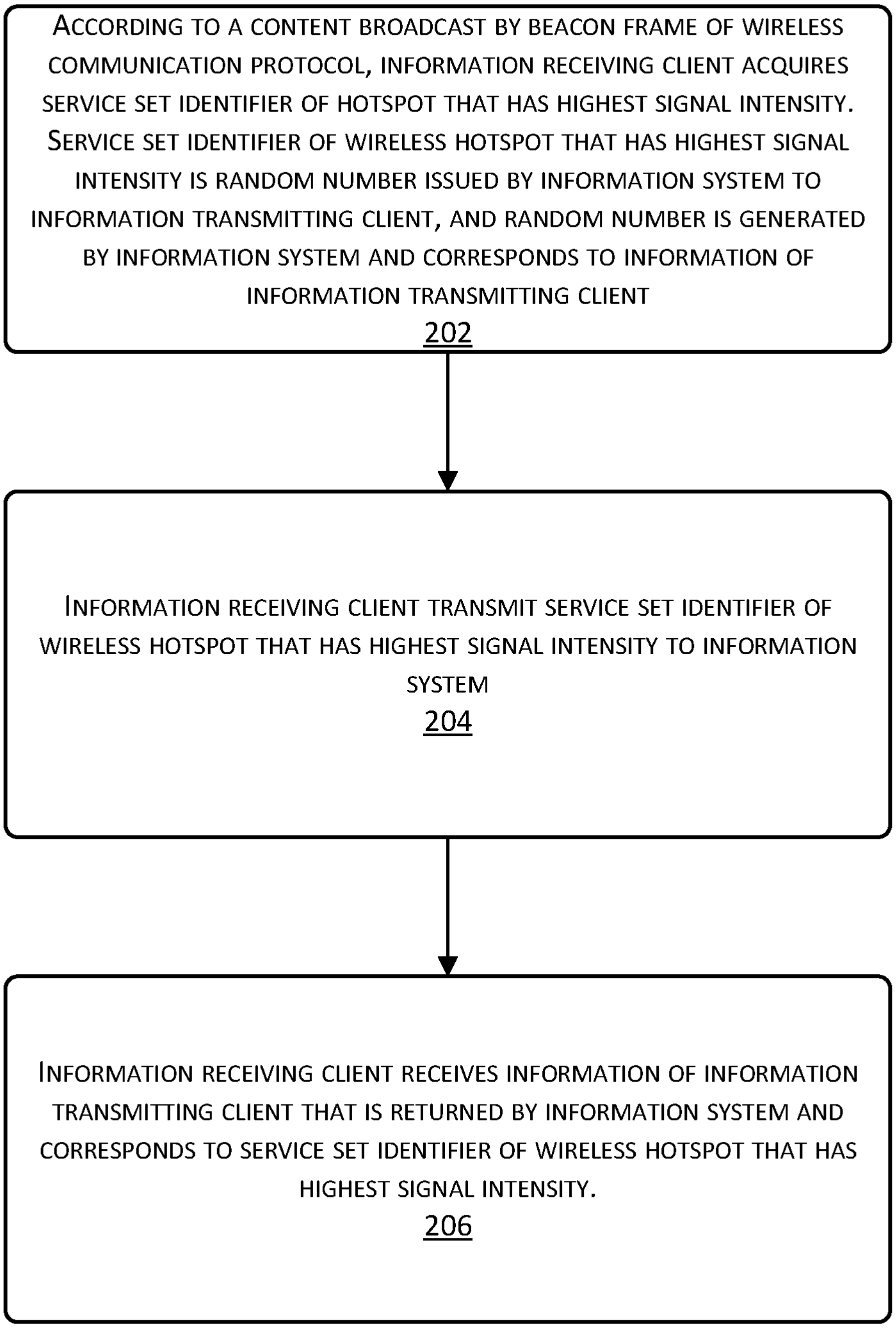
FIG. 2 illustrates a flowchart of a second example method of near field information transmission according to the present disclosure.

FIG. 2 illustrates a flowchart of a second example method of near field information transmission according to the present disclosure.

At 202, according to a content broadcast by a beacon frame of a wireless communication protocol, an information receiving client acquires a service set identifier of a hotspot that has the highest signal intensity. The service set identifier of the wireless hotspot that has the highest signal intensity is a random number issued by the information system to an information transmitting client, and the random number is generated by the information system and corresponds to information of the information transmitting client.

At 204, the information receiving client transmits the service set identifier of the wireless hotspot that has the highest signal intensity to the information system.

At 206, the information receiving client receives information of the information transmitting client that is returned by the information system and corresponds to the service set identifier of the wireless hotspot that has the highest signal intensity.

A hotspot is one mode of WLAN. WLAN function just needs to be turned on to acquire the SSID broadcast by the information transmitting client according to the content broadcast by the beacon frame of the wireless communication protocol.

In real applications, the information receiving client may control the on or off function of the WLAN function. For example, when a user turns on the information transmitting client, the information transmitting client may control the personal hotspot to turn on and off. The information transmitting client may also turn off the personal hotspot after a preset time interval (e.g., 1 hour) or when the user shuts down the information transmitting client. Certainly, the user may also manually turn on or off the personal hotspot of the electronic apparatus. The present disclosure does not impose any restriction herein.

In the near field transmission scenario, the information transmitting client and the information receiving client are relatively close to each other. With respect to the information receiving client, the closer a corresponding hotspot is, the higher its signal intensity becomes. Therefore, the present techniques may ensure that the wireless hotspot frame with the highest signal intensity belongs to the information transmitting client instead of those at a location of a cafeteria, a restaurant, an airport, or a bus station.

In one example embodiment of the present disclosure, the operations that the information receiving client acquires the service set identifier of the hotspot that has the highest signal intensity according to the content broadcast by the beacon frame of the wireless communication protocol may further include the following.

A detection command is transmitted to a WiFi module from the information receiving client. The information receiving client receives a list of service set identifiers of the wireless hotspots and their corresponding signal intensity information returned by the WiFi module according to the detection command. The service set identifier of the wireless hotspot that has the highest signal intensity is identified at the information receiving client from the list of service set identifiers of the wireless hotspots.

In another example, the operations may further include the following.

The WiFi module scans the wireless network beacon frames according to the detection command to obtain the list of service set identifiers of the wireless hotspots. The WiFi module detects signal intensity information of the wireless hotspots in the list of service set identifiers of the wireless hotspots. The WiFi module analyzes the wireless hotspots in the list of service set identifiers of the wireless hotspots to obtain their corresponding service set identifiers. The WiFi module returns the list of service set identifiers of the wireless hotspots and their corresponding signal intensity information.

In the event that the WLAN function has been turned on, a built-in WiFi module in an electronic apparatus may have functions such as scanning beacon frames of wireless communication protocols, detecting signal intensity information of the wireless hotspots, and analyzing their corresponding service set identifiers according to the wireless hotspots. Therefore, the present techniques may acquire the service set identifier of the hotspot that has the highest signal intensity by using the existing functions of the WiFi module, thereby saving cost.

Certainly, one of ordinary skill in the art may also separately design or configure the WiFi module with the above functions according to the actual need. The present disclosure does not impose any restriction on the specific position of the WiFi module.

A test regarding the wireless hotspot signal intensity may be provided herein. The testing information is the following. Assume that there are 2 AP routers and 6 terminals working under the wireless hotspot mode within 2 meters and these 6 terminals include the transmitting party terminal apparatus for testing, the information receiving apparatus may scan to find 8 wireless hotspots and display 8 SSID lists and their related received signal intensities. Since the transmitting party terminal and the receiving party terminal are the closest to each other, it shows in the SSID lists that the received signal corresponding to the SSID of the transmitting party is the strongest. The whole transmission process may be completed within 1 or 2 seconds.

In summary, the example embodiments of the present disclosure use personal hotspot SSID for near field information transmission. The information receiving party can acquire the service set identifier of the hotspot that has the highest signal intensity without inconvenient user operations. As the service set identifier of the wireless hotspot that has the highest signal intensity is a random number corresponding to the information of the information transmitting client, the information receiving client can obtain the information of the information transmitting client based on the communications with the information system. As the personal hotspot SSID includes objective characters that are not easily affected by subjective factors, such as noise, light and input error, the present techniques may effectively ensure the accuracy of near field information transmission.

Figure 3:
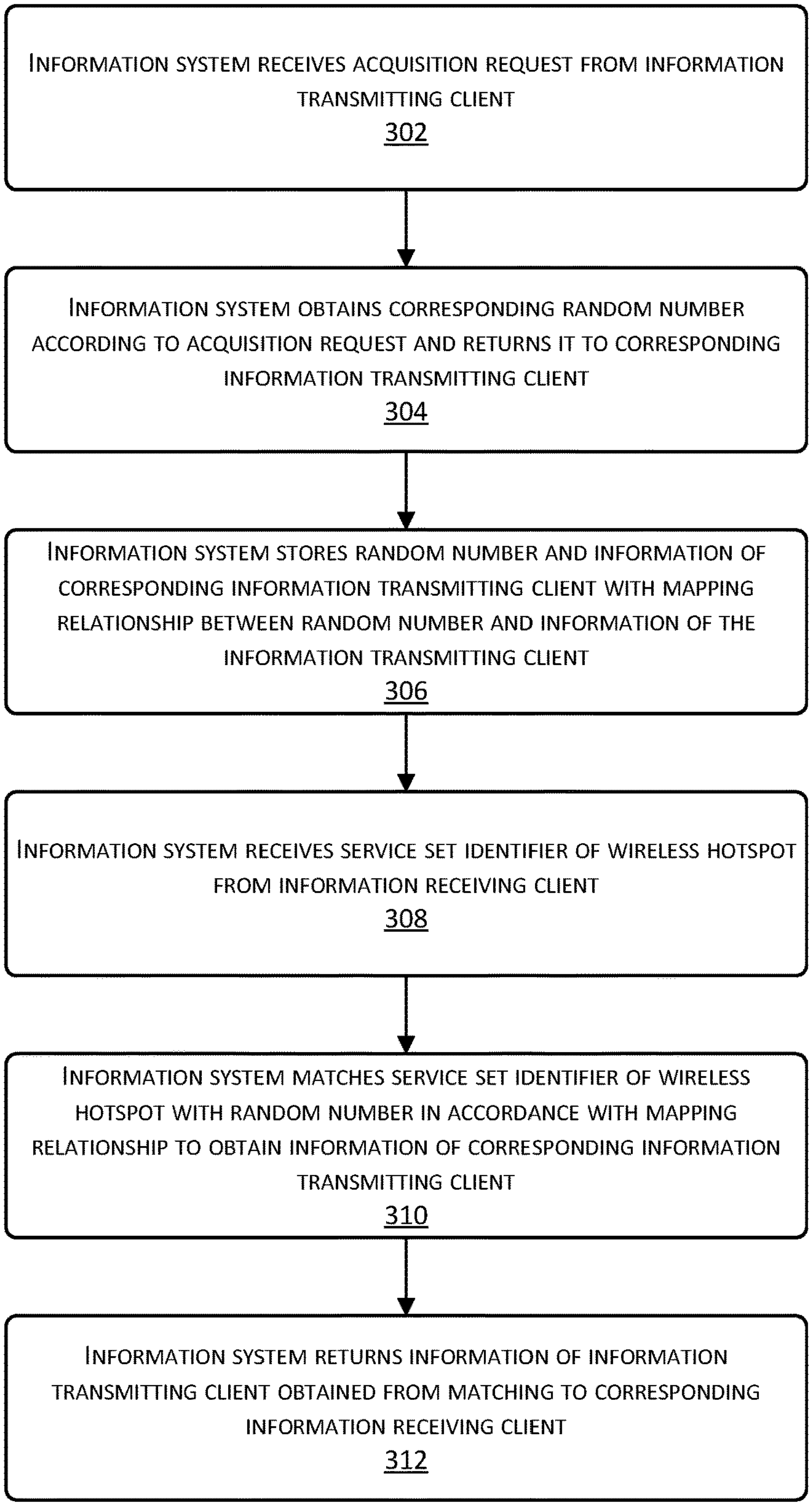
FIG. 3 illustrates a flowchart of a third example method of near field information transmission according to the present disclosure.

FIG. 3 illustrates a flowchart of a third example method of near field information transmission according to the present disclosure.

At 302, an information system receives an acquisition request from an information transmitting client. At 304, the information system obtains a corresponding random number according to the acquisition request, and returns it to the corresponding information transmitting client. At 306, the information system stores the random number and information of the corresponding information transmitting client with a mapping relationship between the random number and the information of the information transmitting client.

At 308, the information system receives a service set identifier of a wireless hotspot from the information receiving client. At 310, the information system matches the service set identifier of the wireless hotspot with the random number in accordance with the mapping relationship to obtain the information of the corresponding information transmitting client.

At 312, the information system returns the information of the information transmitting client obtained from the matching to the corresponding information receiving client.

In this example embodiment of the present disclosure, the random number corresponds to the information of the information transmitting client, which is an effective and unique random number generated by the information system within S minutes. S may be set by one of ordinary skill in the art according to actual needs.

In a practical application, a random number of M bytes may be generated by a variety of random algorithms or Hash algorithms. The M herein may meet the specification requirement for SSID, i.e. equal to or smaller than 32, which may be set by those skilled in the art according to actual needs. For example, M=32. The Hash algorithm may include Message Digest Algorithm 5 (MD5) and Secure Hash Algorithm (SHA) to generate a hexadecimal number of 16 bytes. Since the information to be transmitted is mapped through the random number, and the random number has a valid time period, the present techniques may ensure the security of near field information transmission. Certainly, the applications of the present disclosure to generate random number shall not be limited by Hash algorithms.

Furthermore, the present disclosure does not have limitations on the way to generate a random number. For example, two methods such as random( ) and Math.random( ) may be used to generate a random number of N bytes while N is not greater than 32.

In an example embodiment of the present disclosure, the information system may obtain the corresponding random number according to the acquisition request through the following operations.

A random number is generated by using a random algorithm or a Hash algorithm. Parameters of the random algorithm or Hash algorithm may include one or more of the following parameters: a date of the acquisition request, a time of the acquisition request, and information of the information transmitting client corresponding to the acquisition request.

In this example embodiment, specific parameters may be to generate the random number to further improve the security of the random number. For example, a 16-digit random number may be obtained through a random function such as random (date and time of the acquisition request, the information of the information transmitting client corresponding to the acquisition request).

In one or more example embodiments of the present disclosure, to facilitate an efficient management of the random number, the present techniques may provide an example method of managing the random number.

A random data table is used to store the mapping relationship between the random number and the information of the information transmitting client. The information of the random number stored in the random data table may include a numeric value of the random number, a generation date of the random number and/or a generation time of the random number.

Since the wireless hotspot SSID from the information receiving client is the random number corresponding to the information of the information transmitting client, the information system matches the wireless hotspot SSID with the random number in accordance with the mapping relationship to obtain the information of the corresponding information transmitting client. Such matching operation may include, according to the wireless hotspot SSID from the information receiving client, searching the random data table to find the information of the information transmitting client.

As the random number has the valid time period and is only valid within S minutes, the information system needs to periodically replace the random number. When switching SSID, it is possible that the information system activates a new random number to be associated with the information of the information transmitting client while the information receiving client is still using the old SSID to search the random data table. Thus, when it is unable to use the old SSID to find the information of the information transmitting client, the information receiving client needs to scan the beacon frames of the wireless network again to find if there is any new SSID. If there is the new SSID, the new SSID will be used to send inquiry to the information system.

Figure 4:
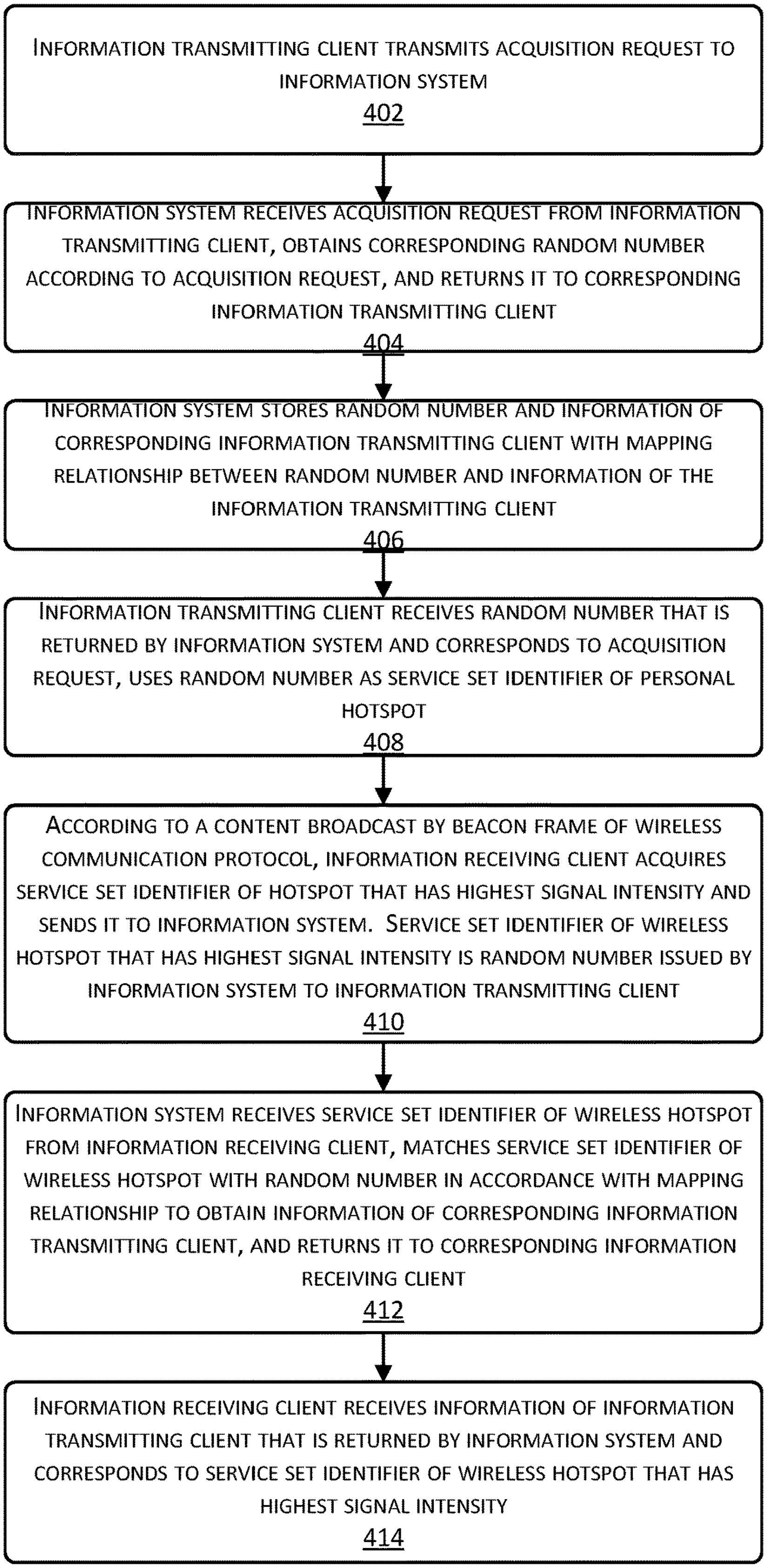
FIG. 4 illustrates a flowchart of a fourth example method of near field information transmission according to the present disclosure.

FIG. 4 illustrates a flowchart of a fourth example method of near field information transmission according to the present disclosure.

At 402, an information transmitting client transmits an acquisition request to an information system. At 404, the information system receives the acquisition request from the information transmitting client, obtains a corresponding random number according to the acquisition request, and returns it to the corresponding information transmitting client.

At 406, the information system stores the random number and information of the corresponding information transmitting client with a mapping relationship between the random number and the information of the information transmitting client.

At 408, the information transmitting client receives the random number that is returned by the information system and corresponds to the acquisition request, uses the random number as the service set identifier of personal hotspot. The service set identifier is broadcast through communication such as a beacon frame of a wireless communication protocol.

At 410, according to a content broadcast by the beacon frame of the wireless communication protocol, the information receiving client acquires a service set identifier of a hotspot that has the highest signal intensity, and transmits the service set identifier of the wireless hotspot that has the highest signal intensity to the information system. The service set identifier of the wireless hotspot that has the highest signal intensity is a random number issued by the information system to the information transmitting client.

At 412, the information system receives the service set identifier of the wireless hotspot from the information receiving client, matches the service set identifier of the wireless hotspot with the random number in accordance with the mapping relationship to obtain the information of the corresponding information transmitting client, and returns the obtained information of the corresponding information transmitting client to the corresponding information receiving client.

At 414, the information receiving client receives the information of the information transmitting client that is returned by the information system and corresponds to the service set identifier of the wireless hotspot that has the highest signal intensity.

To make those skilled in the art better understand the present disclosure, an example method of near field information transmission in AA collection is provided below.

From a perspective of a payee, a user activates the AA collection, such as by shaking a client terminal where the information transmitting client locates. The information transmitting client transmits the acquisition request to the information system, and the information transmitting client receives the random number that is returned by the information system and corresponds to the acquisition request. The random number corresponds to the information of the information transmitting client. The information transmitting client uses the random number as the service set identifier of the personal hotspot, and the service set identifier is broadcast through communication such as the beacon frame of the wireless communication protocol.

From a perspective of a payer, according to the content broadcast by the beacon frame of the wireless communication protocol, the information receiving client acquires the SSID of the hotspot beacon frame that has the highest signal intensity and requests the account number of the payee (such as an online payment account, for instance, a 19-digit ID number of an online Alipay™ account) from the information system.

The information system transmits the payment account number obtained from the matching and the amount together to the payer. The payer confirms the payment. Subsequently, the client terminal of the payee displays that the payment by the payer is successful.

In summary, the present techniques are easy for implementation and reliable, and have low implementation cost and high security and accuracy. For example, the present techniques may be implemented by installing specific client software on electronic apparatuses of customers and merchants.

Figure 5:
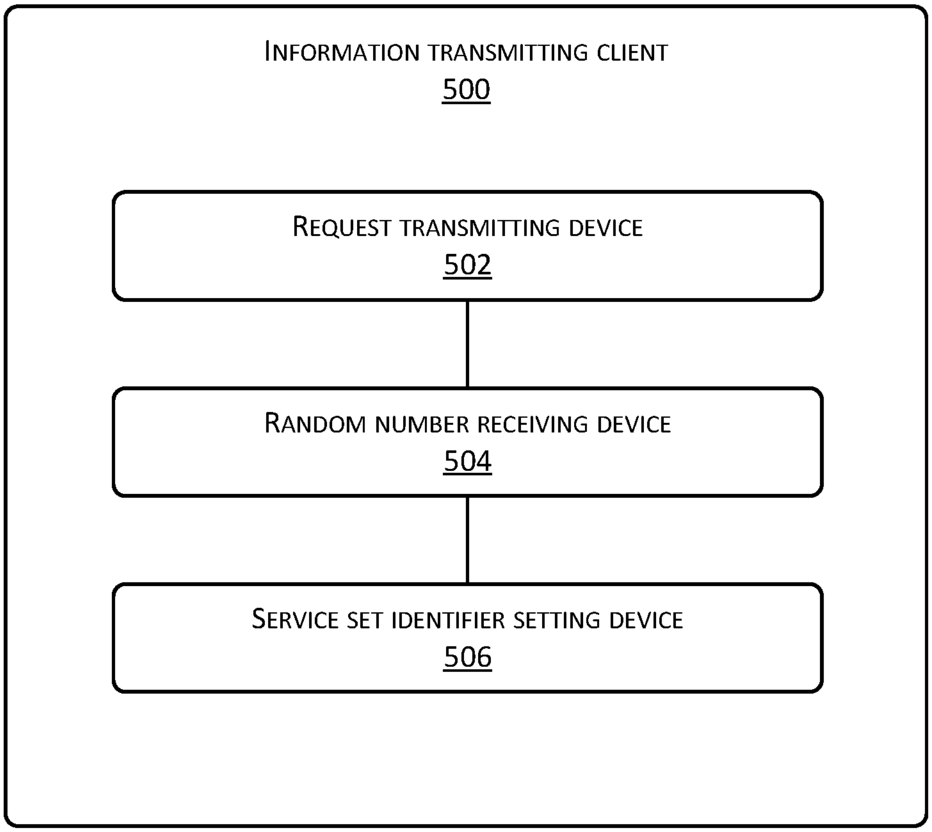
FIG. 5 illustrates a diagram of an example information transmitting client according to the present disclosure.

FIG. 5 illustrates a diagram of an example information transmitting client 500 according to the present disclosure. The information transmitting client 500 may include a request transmitting device 502, a random number receiving device 504, and a service set identifier setting device 506.

The request transmitting device 502 transmits an acquisition request to an information system. The random number receiving device 504 receives a random number corresponding to the acquisition request and returned by the information system. The random number corresponds to the information of the information transmitting client.

The service set identifier setting device 506 uses the random number as a service set identifier of a personal hotspot, and the service set identifier is broadcast through a beacon frame of a wireless communication protocol. For example, the wireless communication protocol may include the IEEE 802.11 protocol.

With respect to the example embodiments of the information transmitting client, as it is similar to the first example method of near field transmission, the description herein is relatively simple and the relevant portions may be referenced to corresponding portions in the first example method of near field transmission.

Figure 6:
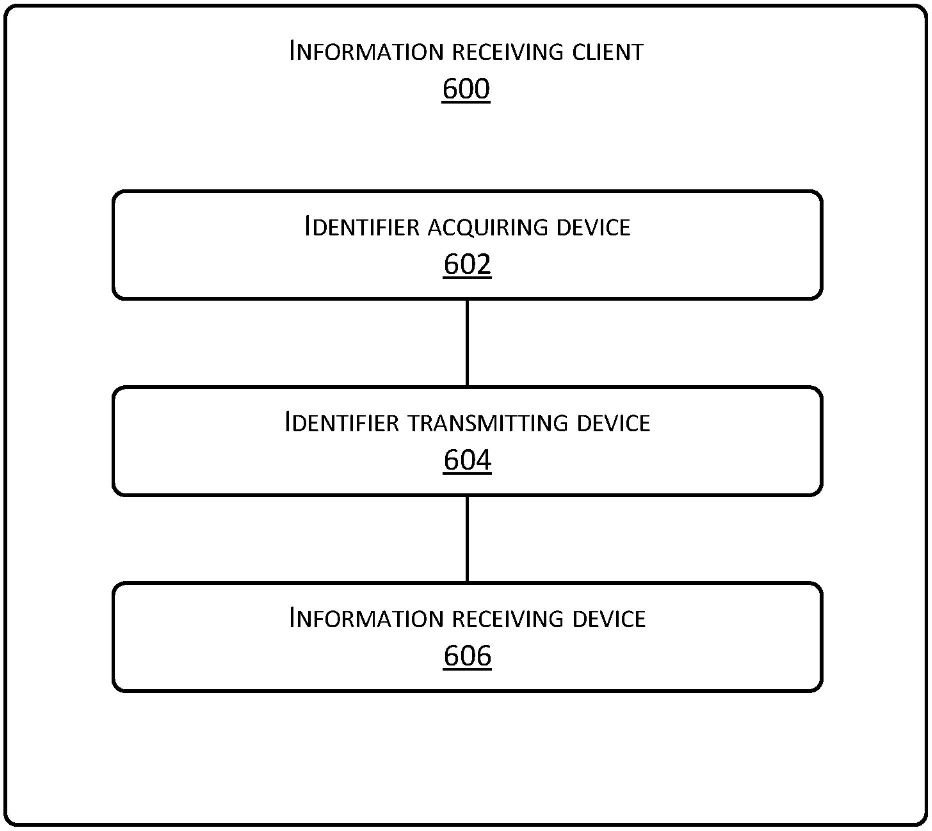
FIG. 6 illustrates a diagram an example information receiving client according to the present disclosure.

FIG. 6 illustrates a diagram of an example information receiving client 600 according to the present disclosure. The information receiving client 600 may include an identifier acquisition device 602, an identifier transmitting device 604, and an information receiving device 606.

The identifier acquisition device 602 acquires a service set identifier of a hotspot that has the highest signal intensity according to content broadcast by a beacon frame of a wireless communication protocol. The service set identifier of the wireless hotspot that has the highest signal intensity is a random number issued by an information system to an information transmitting client, and the random number is generated by the information system and corresponds to the information of the information transmitting client.

The identifier transmitting device 604 transmits the service set identifier of the wireless hotspot that has the highest signal intensity to the information system.

The information receiving device 606 receives the information of the information transmitting client that is returned by the information system and corresponds to the service set identifier of the wireless hotspot that has the highest signal intensity.

In an example embodiment of the present disclosure, the identifier acquisition device 602 may further include a command transmitting module, a result receiving module, and an identifying module.

The command transmitting module transmits a detection command to a WiFi module.

The result receiving module receives a list of service set identifiers of wireless hotspots and their corresponding signal intensity information returned by the WiFi module according to the detection command.

The identifying module identifies at the information receiving client the service set the identifier of the wireless hotspot that has the highest signal intensity from the list of service set identifiers of the wireless hotspots.

Correspondingly, the WiFi module may further include the following sub-modules. A scanning sub-module scans wireless network beacon frames according to the detection command to obtain the list of service set identifiers of the wireless hotspots. A detecting sub-module detects the signal intensity information of the wireless hotspots in the list of service set identifiers of the wireless hotspots. An analyzing sub-module analyzes the wireless hotspots in the list of service set identifiers of the wireless hotspots to obtain their corresponding service set identifiers. The returning sub-module returns the list of service set identifiers of the wireless hotspots and their corresponding signal intensity information.

With respect to the example information receiving client, as its implementation is substantially similar to the second example method of near field information transmission, the description is relatively simple and the relevant portions may be referenced to corresponding portions in the second example method of near field information transmission.

Figure 7:
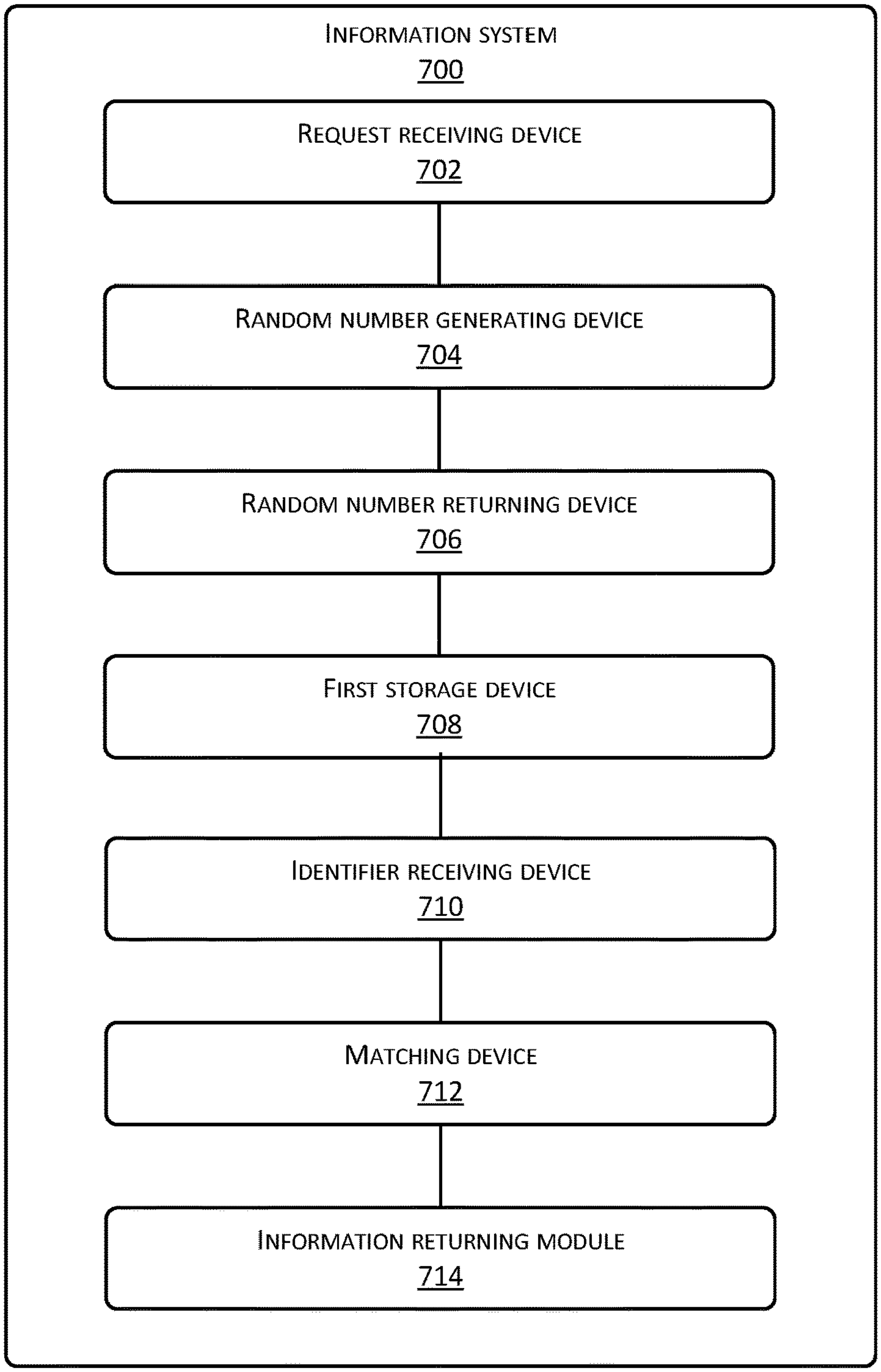
FIG. 7 illustrates a diagram of an example information system according to the present disclosure.

FIG. 7 illustrates a diagram of an example information system 700 according to the present disclosure. The information system 700 may include a request receiving device 702, a random number generating device 704, a random number returning device 706, and a first storage device 708.

The request receiving device 702 receives an acquisition request from an information transmitting client. The random number generating device 704 obtains a corresponding random number according to the acquisition request.

The random number returning device 706 returns the random number to the corresponding information transmitting client. The first storage device 708 stores the random number and information of the corresponding information transmitting client with a mapping relationship between the random number and the information of the information transmitting client.

The identifier receiving device 710 receives the service set identifier of the wireless hotspot from the information receiving client. The matching device 712 matches the service set identifier of the wireless hotspot with the random number in accordance with the mapping relationship to obtain the information of the corresponding information transmitting client; and The information returning device 714 returns the information of the information transmitting client obtained from the matching to the corresponding information receiving client.

In an example embodiment of the present disclosure, the random number generating device 704 may specifically be used to generate the by random number using a random algorithm or a Hash algorithm. Parameters of the random algorithm or the Hash algorithm may specifically include one or more of the following: a date of the acquisition request, a time of the acquisition request, and the information of the information transmitting client corresponding to the acquisition request.

In one or more example embodiments of the present disclosure, the information system may further include a second storage device. The second storage device uses a random data table to store the mapping relationship between the random number and the information of the information transmitting client. Information of a random number stored in the random data table may include one or more of the following: a numeric value of the random number, a generation date of the random number and/or a generation time of the random number.

With respect to the example information system, as it is substantially similar to the third example method of near field information transmission, the description is relatively simple and the relevant portions may be referenced to corresponding portions in the third example method of near field information transmission.

Figure 8:
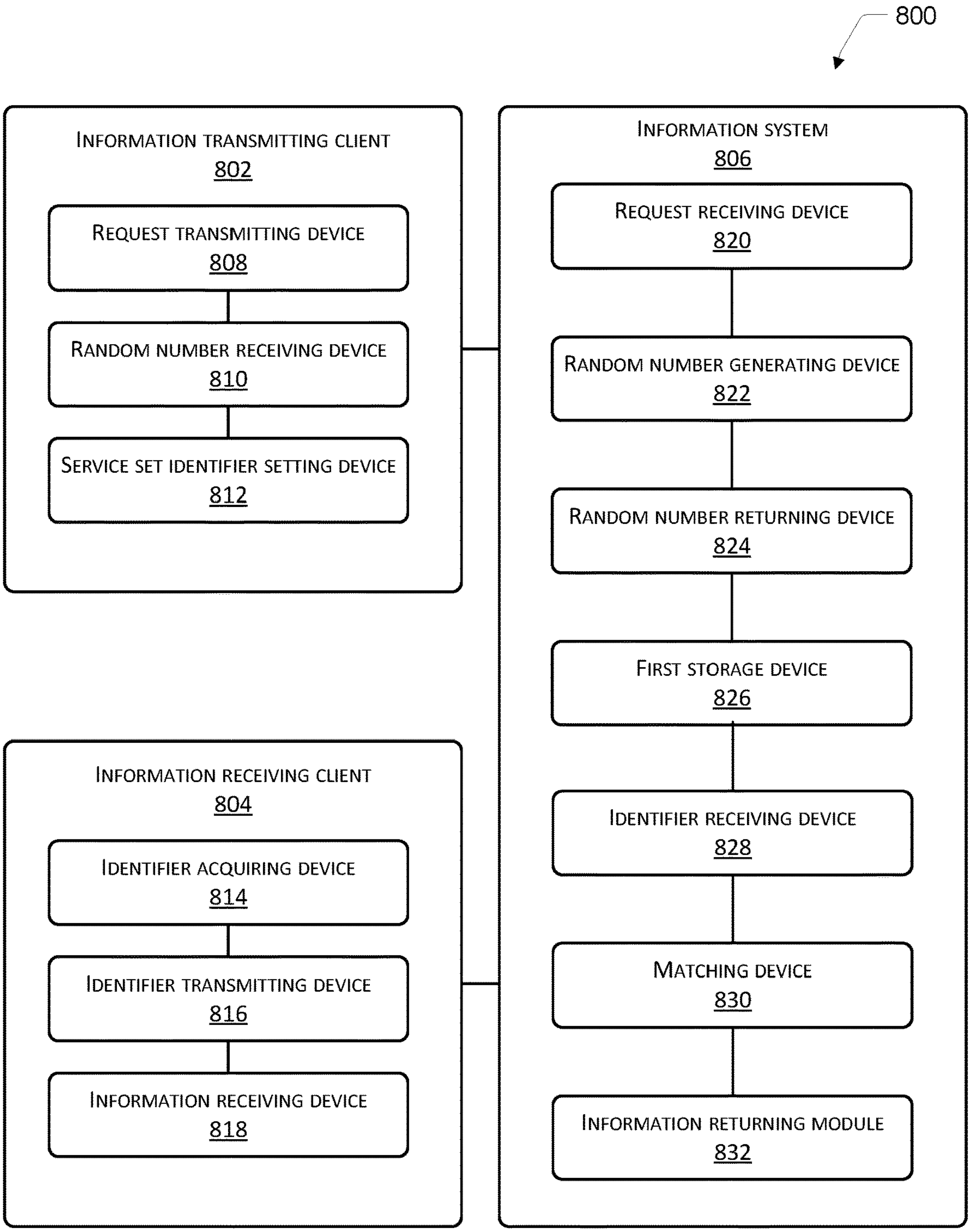
FIG. 8 illustrates a diagram of an example near field information transmission system according to the present disclosure.

FIG. 8 illustrates a diagram of an example near field information transmission system 800 according to the present disclosure. The near field information transmission system 800 may include an information transmitting client 802, an information receiving client 804, and an information system 806.

The information transmitting client 802 may include a request transmitting device 808, a random number receiving device 810, a service set identifier setting device 812. The request transmitting device 808 transmits an acquisition request to the information system 806. The random number receiving device 810 receives the random number that is returned by the information system 806 and corresponds to the acquisition request. The service set identifier setting device 812 uses the random number as a service set identifier of a personal hotspot. The service set identifier may be broadcast through a beacon frame of a wireless communication protocol.

The information receiving client 804 may include an identifier acquiring device 814, an identifier transmitting device 816, and an information receiving device 818. The identifier acquiring device 814 acquires a service set identifier of a hotspot that has the highest signal intensity according to a content broadcast by a beacon frame of the wireless communication protocol. The service set identifier of the wireless hotspot that has the highest signal intensity is a random number issued by the information system to the information transmitting client;

The identifier transmitting device 816 transmits the service set identifier of the wireless hotspot that has the highest signal intensity to the information system 806. The information receiving device 818 receives the information of the information transmitting client that is returned by the information system and corresponds to the service set identifier of the wireless hotspot that has the highest signal intensity.

The information system 806 may include a request receiving device 820, a random number generating device 822, a random number returning device 824, a first storage device 826, an identifier receiving device 828, a matching device 830, and an information returning device 832.

The request receiving device 820 receives an acquisition request from the information transmitting client 802. The random number generating device 822 generates the corresponding random number according to the acquisition request. The random number returning device 824 returns the random number to the corresponding information transmitting client 802. The first storage device 826 stores the random number and the information of the corresponding information transmitting client 802 with the mapping relationship between the random number and the information of the information transmitting client 804.

The identifier receiving device 828 receives the service set identifier of the wireless hotspot from the information receiving client 804. The matching device 830 matches the service set identifier of the wireless hotspot with the random number in accordance with the mapping relationship to obtain the information of the corresponding information transmitting client 802. The information returning device 832 returns the information of the information transmitting client 802 obtained from the matching to the corresponding information receiving client 804.

One of ordinary skill in the art should understand that the embodiments of the present disclosure can be methods, systems, or the programming products of computers. Therefore, the present disclosure can be implemented by hardware, software, or in combination of both. In addition, the present disclosure can be in a form of one or more computer programs containing the computer-executable instructions which can be implemented in the computer-executable storage medium (including but not limited to disks, CD-ROM, optical disks, etc.).

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a device of implementing one or more flows of the flow chart and/or one or more blocks of the block diagram can be generated through the instructions operated by a computer or other programmable data processors.

In some example embodiments, the devices or systems described herein may include one or more processor(s) and memory. The memory is an example of computer-readable media. As used herein, “computer-readable media” includes computer storage media and communication media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage apparatus, or any other non-transmission medium that can be used to store information for access by a computing apparatus. In contrast, communication media may embody computer-readable instructions, data structures, program modules, or other data in a modulated data signal, such as a carrier wave. As defined herein, computer storage media does not include communication media. The memory may store therein program units or modules and program data.

These computer program instructions can also be stored in other computer-readable storage which can instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions can also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The embodiments are merely for illustrating the present disclosure and are not intended to limit the scope of the present disclosure. It should be understood for persons in the technical field that certain modifications and improvements can be made. Thus, the claims shall be constructed to cover not only the example embodiments of the present disclosure but also any modification and change under the protection of the present disclosure.

The example embodiments in the present disclosure are described progressively. Each example embodiment emphasizes differences from the other example embodiments. The same or similar portions in each example embodiment may be referenced to each other.

The present disclosure provides a near field information transmission method and system, an information transmitting client, an information receiving client, and an information system. The example embodiments are merely for illustrating the methods and core concepts of the present disclosure and are not intended to limit the scope of the present disclosure. It should be understood by one of ordinary skill in the art that certain modifications, replacements, and improvements can be made and should be considered under the protection of the present disclosure and its claims without departing from the principles of the present disclosure. The descriptions herein shall not be understood to restrict the present disclosure.

What is claimed is:

1. A data storage device containing computer executable instructions configured to be installed on a client device, which when executed by a processing unit of the client device, configures the processing unit to implement at least one of a payee client and a payer client;

wherein the payee client is operable to:

create an outgoing payment transaction requesting payment to a payee at a server;

identify with the server an account information to be transmitted for the outgoing payment transaction;

receive from the server a key corresponding to the account information; and cause to activate a personal wireless hotspot of the client device using the key as a service set identifier of the personal wireless hotspot; and wherein the payer client is operable to:

acquire a candidate service set identifier of a personal wireless hotspot of another device; and submit the candidate service set identifier to the server with a request for an account information for an incoming payment transaction created at the server requesting payment by a payer.

2. The data storage device of claim 1, wherein the payer client is operable to acquire a candidate service set identifier of a personal wireless hotspot of another device by:

detecting signal intensities of multiple personal wireless hotspots of other devices;

identifying a candidate personal wireless hotspot which has a highest signal intensity among the multiple wireless hotspots; and acquiring a service set identifier of the candidate personal wireless hotspot as the candidate service set identifier.

3. The data storage device of claim 1, wherein the payer client is operable to acquire a candidate service set identifier of a personal wireless hotspot of another device by causing a WiFi module of the client device to detect personal wireless hotspots and corresponding signal intensities.

4. The data storage device of claim 3, wherein the WiFi module is configured to detect a wireless hotspot based on a signal intensity of the wireless hotspot.

5. The data storage device of claim 1, wherein the payer client is operable to acquire the candidate service set identifier of a personal wireless hotspot of another device by:

detecting a personal wireless hotspot of a particular device closest to the client device among multiple personal wireless hotspots of other devices; and identifying a service set identifier of the personal wireless hotspot of the particular device as the candidate service set identifier.

6. The data storage device of claim 1, wherein the personal wireless hotspot of another device has a signal range;

wherein the payer client acquires the candidate service set identifier of the personal wireless hotspot of another device while the client device is within the signal range of the personal wireless hotspot; and wherein the payer client submits the candidate service set identifier to the server with a request for an account information for an incoming payment transaction created at the server requesting payment by the payer while the client device is within the signal range of the personal wireless hotspot.

7. The data storage device of claim 1, wherein the payer client is further operable to:

receive account information from the server; and transmit a payment requested by the incoming payment transaction to an account identified by the account information.

8. The data storage device of claim 7, wherein the payee client is further operable to display information regarding the transmission of the payment upon transmission of the payment.

9. The data storage device of claim 1, wherein the payer client is further operable to:

receive the incoming payment transaction from the server reflected in an account of the payer;

display an interface of a payment platform; and transmit a payment requested by the incoming payment transaction in response to an interaction with the interface of the payment platform.

10. The data storage device of claim 9, wherein the payee client is further operable to:

receive the transmitted payment reflected in an account of the payee; and display information regarding the transmission of the payment upon transmission of the payment.

* * * * *